United States Patent
Yatabe et al.

(10) Patent No.: US 7,472,948 B2
(45) Date of Patent: Jan. 6, 2009

(54) VEHICLE BODY STRUCTURE

(75) Inventors: Takayuki Yatabe, Kawasaki (JP); Keishi Goto, Okazaki (JP); Masashi Umeda, Okazaki (JP); Akitoshi Shii, Okazaki (JP)

(73) Assignees: Mitsubishi Jidosha Engineering Kabushiki Kaisha, Ukazahi (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/234,242

(22) Filed: Sep. 26, 2005

(65) Prior Publication Data

US 2006/0066137 A1 Mar. 30, 2006

(30) Foreign Application Priority Data

Sep. 29, 2004 (JP) .............................. 2004-284964

(51) Int. Cl.
*B60J 7/00* (2006.01)
(52) U.S. Cl. .............................. 296/203.04; 296/203.01
(58) Field of Classification Search ............ 296/203.04, 296/198, 187.11, 187.03, 203.01
See application file for complete search history.

(56) References Cited

U.S. PATENT DOCUMENTS

| 2,113,075 | A | * | 4/1938 | Breer et al. | ............. 296/203.01 |
| 2,115,903 | A | * | 5/1938 | Breer et al. | ............. 296/203.01 |
| 2,198,653 | A | * | 4/1940 | Breer et al. | ............. 296/203.04 |
| 2,225,976 | A | * | 12/1940 | Cadwallader | .......... 296/203.01 |
| 2,234,781 | A | * | 3/1941 | Schjolin | ..................... 296/198 |
| 2,248,319 | A | * | 7/1941 | Waterhouse, Jr. | ...... 296/203.01 |
| 2,324,677 | A | * | 7/1943 | Cadwallader | ................ 296/192 |
| 4,392,684 | A | * | 7/1983 | Yoshitsugu et al. | .... 296/203.04 |
| 4,875,733 | A | * | 10/1989 | Chado et al. | ........... 296/203.04 |
| 4,950,025 | A | * | 8/1990 | Yoshii | .................... 296/203.04 |
| 4,973,103 | A | * | 11/1990 | Imajyo et al. | .......... 296/203.04 |
| 5,018,780 | A | * | 5/1991 | Yoshii et al. | ........... 296/203.04 |
| 5,102,186 | A | * | 4/1992 | Yoshii et al. | ........... 296/203.04 |
| 5,228,741 | A | * | 7/1993 | Ide | ........................ 296/187.11 |
| 5,246,263 | A | * | 9/1993 | Tanaka et al. | .......... 296/187.11 |
| 5,645,312 | A | * | 7/1997 | Enning et al. | .......... 296/203.04 |
| 6,719,321 | B2 | * | 4/2004 | Yasuhara et al. | ......... 280/730.2 |
| 6,938,950 | B2 | * | 9/2005 | Nagafuchi et al. | ..... 296/203.02 |
| 7,021,703 | B2 | * | 4/2006 | Yamaguchi et al. | .... 296/203.04 |
| 7,083,225 | B2 | * | 8/2006 | Yakata et al. | .......... 296/203.04 |
| 2002/0185892 | A1 | * | 12/2002 | Rima et al. | ............. 296/203.01 |
| 2003/0006592 | A1 | * | 1/2003 | Yasuhara et al. | ......... 280/730.2 |
| 2006/0066137 | A1 | * | 3/2006 | Yatabe et al. | .......... 296/203.04 |
| 2006/0197300 | A1 | * | 9/2006 | Nakashima et al. | ... 280/124.109 |

FOREIGN PATENT DOCUMENTS

JP 05077767 A * 3/1993
JP 11-291947 A 10/1999

* cited by examiner

*Primary Examiner*—Kiran B. Patel
(74) *Attorney, Agent, or Firm*—Birch, Stewart, Kolasch & Birch, LLP

(57) ABSTRACT

The vehicle body structure is suitable for use in two-door automobiles. The strength of a rearward part of the vehicle body is increased to reliably suppress the deformation of the vehicle body in a possible collision from behind the vehicle. The vehicle body structure includes: a rear wheel house arranged to the rear of a center pillar; and a reinforcement member directly connecting a front part in front of the top portion of the rear wheel house with the center pillar, the front part being inclusive of the top portion of the rear wheel house.

4 Claims, 9 Drawing Sheets

A−A

B−B

VEHICLE BODY STRUCTURE

BACKGROUND OF THE INVENTION (1) Field of the Invention

The present application relates to a vehicle body structure suitable for use in two-door automobiles.

(2) Description of the Related Art

FIG. 11 is a schematic diagram showing a rear part of a conventional two-door vehicle body. As shown in FIG. 11, at the lower part of the vehicle body 100, side members 101 extend in the longitudinal direction of the vehicle body on both sides of the vehicle body. Each side member 101 has a step-like difference in level in the vicinity of a position at which a rear tire W is disposed, in order to avoid interference with suspension components (not illustrated). Thus, as shown in FIG. 11, the side member 101 is bent at bend portions 101a and 101b.

Here, a cross member 102 extending in the widthwise direction of the vehicle body is provided at a position where a suspension of the vehicle is disposed, and this cross member extends between the side members on both sides at the rear of the vehicle body. This cross member 102 improves the rigidity of the vehicle body against an input from the suspension.

Further, as shown in FIG. 11, the cross member 102 is connected with a rear pillar (C pillar) 105 of the vehicle body via a reinforcement 104. Here, the reinforcement 104 is disposed along the rear pillar 105, and a closed cross section is formed by a combination of the rear pillar 105 and the reinforcement 104.

The lower end of the reinforcement 104 is lengthened to be connected with the cross member 102, thereby providing the vehicle body with further improved rigidity. Note that reference character 106 in FIG. 11 denotes the center pillar of the vehicle.

In addition to the above prior art, Japanese Patent Application Laid-Open No. HEI 11-291947 discloses an art in which a wheel house of a vehicle body is connected with the rear pillar of the vehicle by means of a first reinforcement, and in which the first reinforcement is connected with the center pillar of the vehicle by means of a second reinforcement.

There are technologies in which vehicle bodies are deformed to absorb impact energy caused in a collision. However, at the time of a collision from behind a vehicle, protecting a fuel tank is a high priority, and thus there is a demand for an art for absorbing (or converting) impact energy without deforming the vehicle body. To realize this, deformation of the vehicle body should be considerably suppressed.

However, in the art as shown in FIG. 11, since the side member 101 has a step-like level difference thereof, the side member 101 tends to be deformed, at the time of a collision from behind, in the direction indicated by the arrow in FIG. 11 with the bend portions 101a and 101b as base points, so that the side member 101 could be greatly deformed in such a manner as shown by dotted lines in FIG. 11.

In addition, in the above-described art, since the reinforcement 104 is provided for the purpose of ensuring rigidity of the vehicle body, it does not contribute much to the improvement of the strength of the vehicle body. Thus, it is not easy for the above-described reinforcement 104 to suppress a considerable deformation caused when a large load is applied in a collision from behind the vehicle.

When the reinforcement 104 is used to suppress the vehicle body deformation, there is a problem that the effect of deformation suppression greatly depends on a positional relationship between the rear pillar and the cross member. For example, in a case where a positional relationship between the rear pillar and the cross member is such as that shown in FIG. 11, the reinforcement 104 is capable of enduring an input from the lower direction in FIG. 11, but incapable of enduring an input from behind the vehicle (an input from the right in FIG. 11), so that it is impossible to suppress the deformation of the vehicle body.

Further, in the art disclosed in the above-mentioned patent application, the load caused at the time of a collision from behind the vehicle is transferred to the rear pillar via the first reinforcement, and is also transferred to the center pillar via the second reinforcement. In this art, the first reinforcement is approximately vertically connected with the rearward part of the wheel house from above. Thus, when load is input from behind (at the time of a collision from behind the vehicle), it is impossible to sufficiently suppress the forward deformation of the wheel house.

That is, at the time of a collision from behind, the load is transferred to the first reinforcement, which is approximately orthogonal to the load input direction, and then is transferred to the second reinforcement, which extends in the longitudinal direction of the vehicle body, whereby the load is transferred to the rear pillar and the center pillar via the first reinforcement and the second reinforcement, respectively.

However, as already described, the first reinforcement is connected to the rear wheel house, and the connection direction is orthogonal to the load input direction. Thus, moment, not compressive load, is input to the first reinforcement, so that it is impossible to suppress the deformation of the vehicle body.

With the foregoing problems in view, it is an object of the present invention to provide a vehicle body structure in which the strength of the rearward part of the vehicle body is improved so that the deformation of the vehicle body at the time of a collision from behind the vehicle is reliably suppressed.

SUMMARY OF THE INVENTION

In order to accomplish the above object, according to the present invention, there is provided a vehicle body structure, including: a rear wheel house arranged to the rear of a center pillar; and a reinforcement member directly connecting a front part in front of the top portion of the rear wheel house with the center pillar, the front part being inclusive of the top portion of the rear wheel house.

Therefore, according to the vehicle body structure of the present invention, at the time of a collision from behind, it is possible, with a simple structure, to efficiently transfer impact energy to a center pillar via a reinforcement. As a result, the impact energy is converted to kinetic energy which will give the vehicle acceleration, so that it is possible to reliably suppress the deformation of the vehicle body. Further, the vehicle body structure of the present invention is advantageous in that the vehicle body deformation is suppressed irrespective of the positional relationship between the rear pillar and the cross member. In consequence, it is possible to suppress the relative displacement of a fuel tank, so that the fuel tank is protected from damages thereto.

Other objects and further features of the present invention will be apparent from the following detailed description when read in conjunction with the relevant accompanying drawings.

DESCRIPTION OF THE INVENTION

Figure 1:
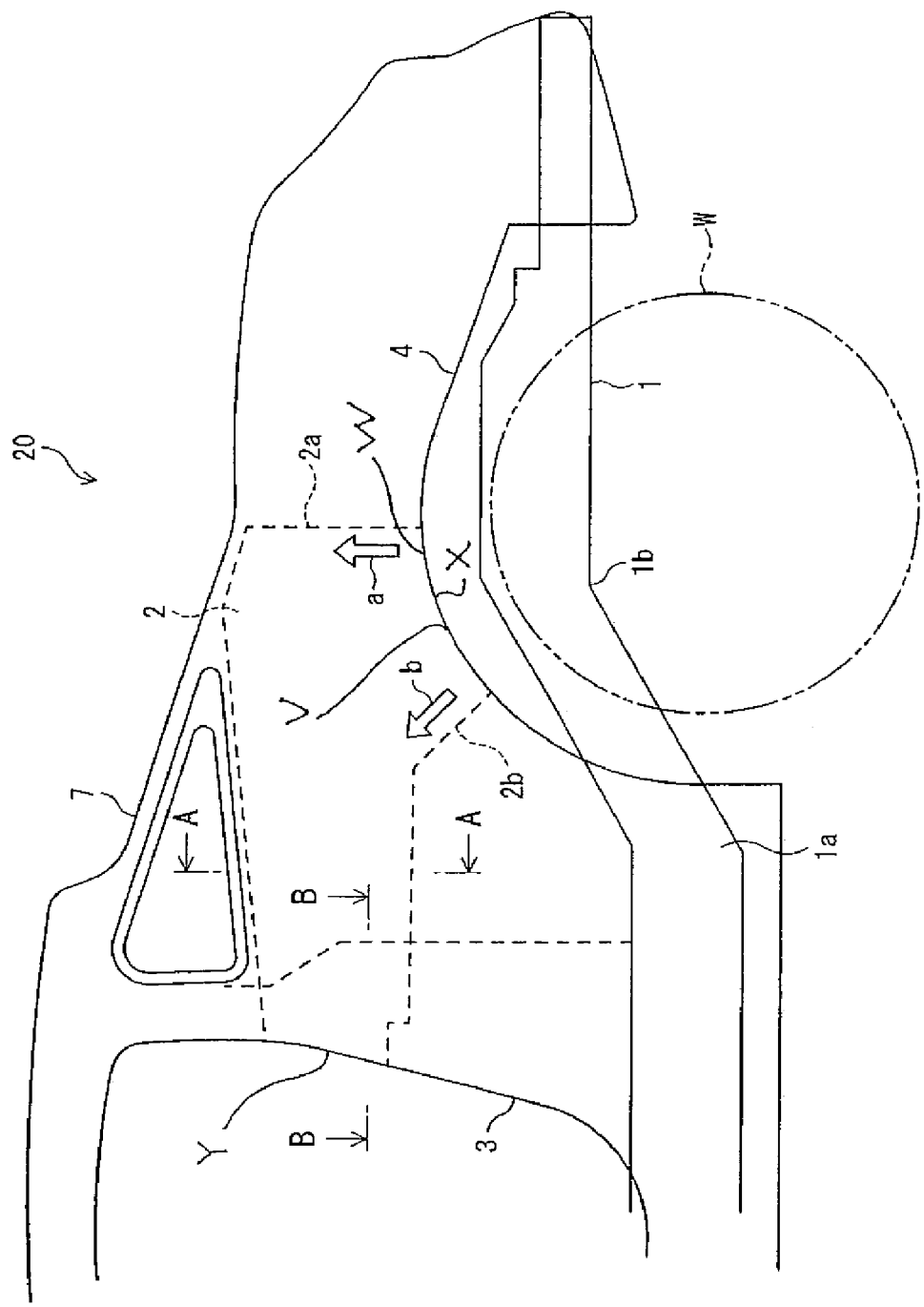
FIG. 1 is a schematic diagram showing a construction of an important part of a vehicle body structure according to one preferred embodiment of the present invention.

Referring to the relevant drawings, a description will be made hereinbelow of a vehicle body structure according to one preferred embodiment of the present invention. In FIG. 1, reference character 20 denotes a body structure of vehicle body (here a two-door automobile) to which the present invention is applied. The body structure 20 has a rear wheel house 4 arranged to the rear of a center pillar 3, and the rear wheel house 4 accommodates a rear wheel (rear tire) W therein.

As shown in FIG. 1, side members 1 are provided at the lower part of the vehicle body. The side members 1 extend along the longitudinal direction of the vehicle body on both sides thereof. Each side member 1 has a step-like difference in level (height) in the vicinity of a position at which a rear tire is disposed, in order to avoid interference with suspension components (not illustrated). Thus, as shown in FIG. 1, the side member 1 is bent at bend portions 1a and 1b.

Here, a cross member (not illustrated) extending in the widthwise direction of the vehicle body is provided at a position where a suspension of the vehicle is disposed, and this cross member extends between the side members on both sides at the rear of the vehicle body.

Figure 8:
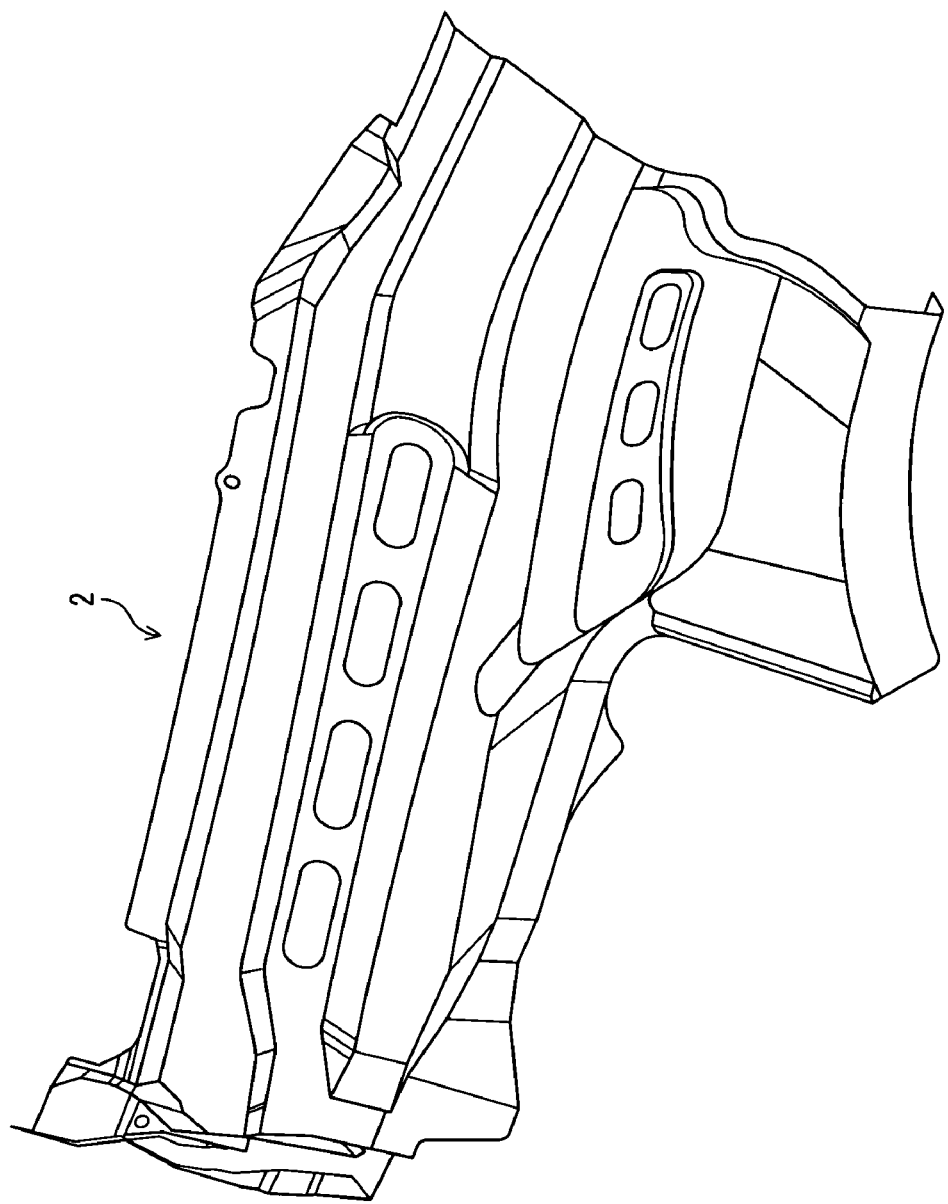
FIG. 8 is a schematic perspective view showing a belt line reinforcement of a vehicle body structure of the present embodiment.

Further, a belt line reinforcement (reinforcement member) 2, as shown in FIG. 1 and FIG. 8, is disposed between the rear wheel house 4 and the center pillar 3. Here, as shown in FIG. 1, the rear end of the belt line reinforcement 2 is connected with a vehicle body part in front part of the top portion W of the rear wheel house 4, and the direction in which the belt line reinforcement 2 is connected with the rear wheel house 4 is identical to the direction in which the rear fire W is displaced at the time of a collision from behind.

More specifically, as shown in FIG. 1, the rear end X of the belt line reinforcement 2 has a first side 2a, which extends approximately vertically from fight above and connected to the vicinity of the top of the rear wheel house 4, and a second side 2b which extends from diagonally above the rear wheel house 4 and connected to the rear wheel house 4. The first side 2a suppresses an upward displacement of the rear tire W at the time of a collision from behind (see arrow a); the second side 2b suppresses a diagonally forward displacement of the rear tire W at the time of a collision from behind (see arrow b). Here, the direction in which the rear tire will be displaced at the time of a collision from behind is between arrow a and arrow b, that is, between the upward direction and the diagonally upper front direction relative to the center of the rear tire.

Further, the front end Y of the belt line reinforcement 2 is connected with the center pillar 3 from the horizontal direction so that the belt line reinforcement 2 is approximately orthogonal to the center pillar 3. Furthermore, a connection part between the belt line reinforcement 2 and the center pillar 3 is located higher than a connection part between the belt line reinforcement 2 and the rear wheel house 4. Here, the belt line reinforcement 2 is not directly connected with a rear pillar 7, but is indirectly connected with the rear pillar 7 via a quarter inner panel assembly 9 (quarter panel) (see FIG. 6) which will be described below.

Figure 4:
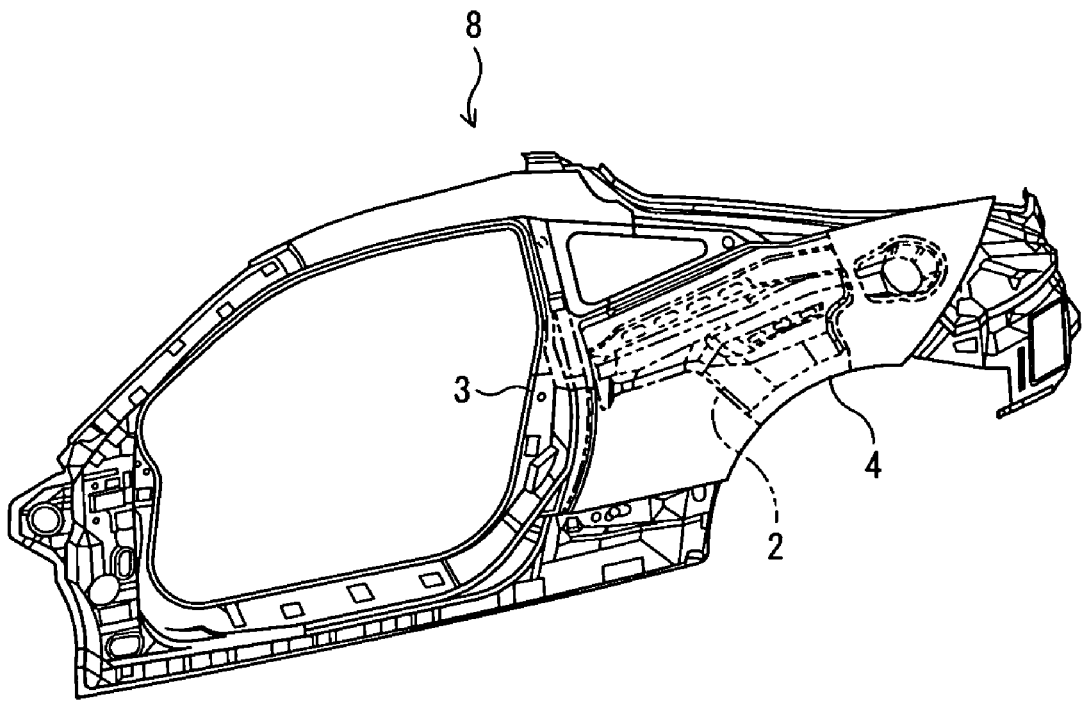
FIG. 4 is a schematic perspective view showing the shape of a side outer panel assembly which is applied to the vehicle body structure of the present embodiment.
Figure 5:
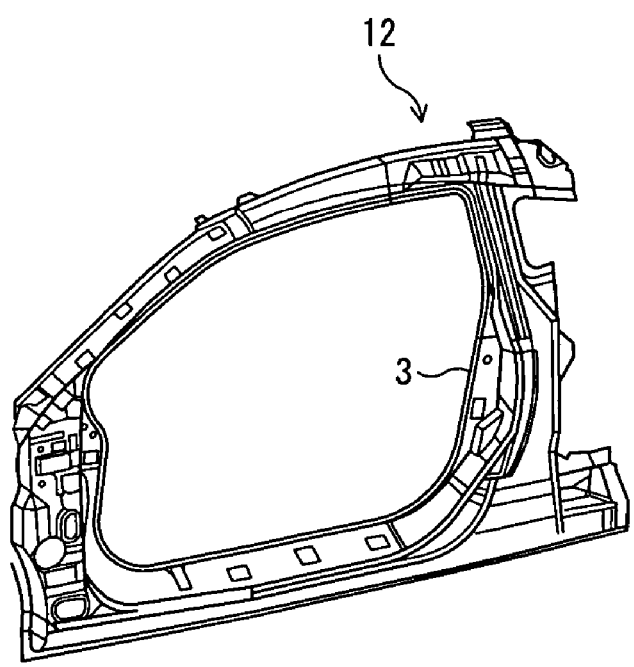
FIG. 5 is a schematic perspective view showing a side outer reinforcement assembly which is applied to the vehicle body structure of the present embodiment.
Figure 6:
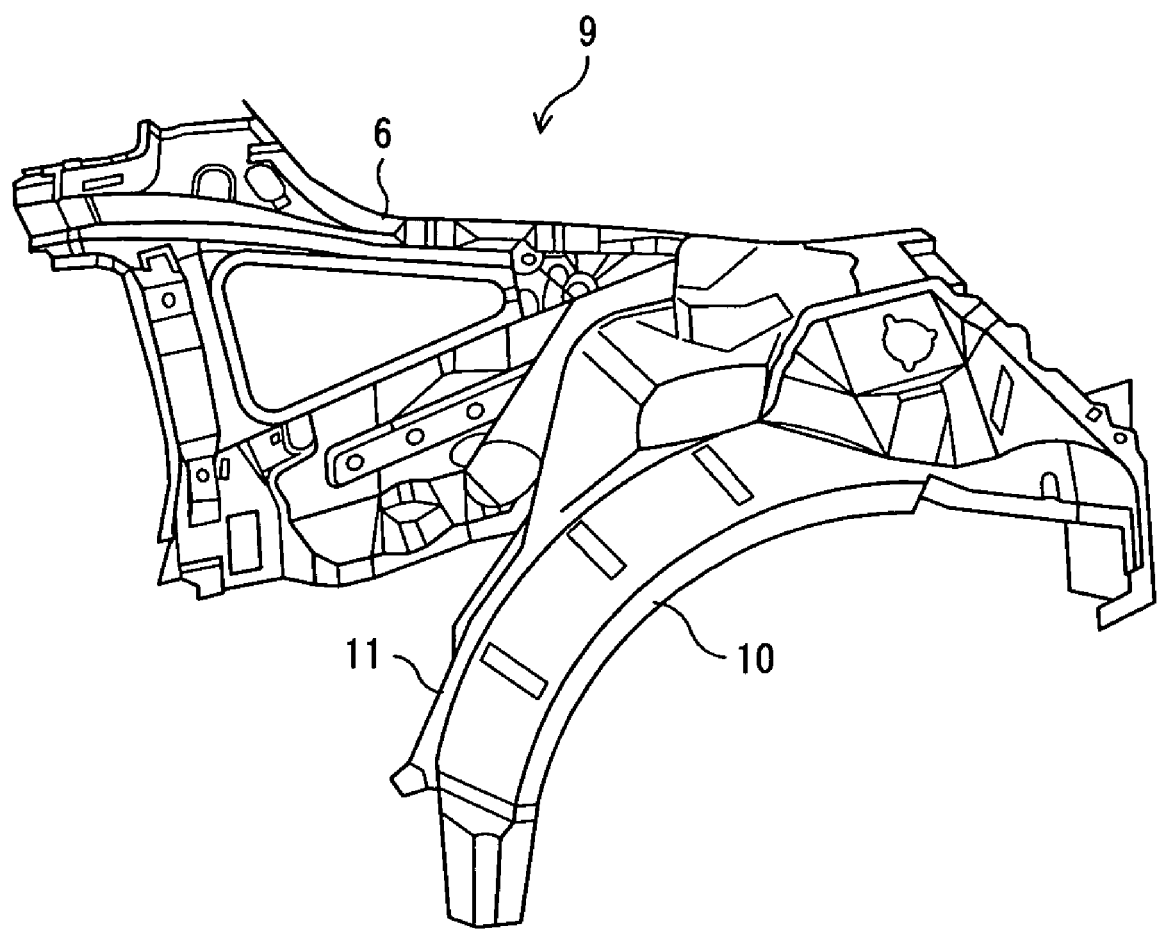
FIG. 6 is a schematic perspective view showing a quarter inner panel assembly which is applied to the vehicle body structure of the present embodiment.

Next, a description will be made of a rear part of the body structure 20. The rear part of the vehicle body 20 is formed by a side outer panel assembly 8 (FIG. 4), a side outer reinforcement assembly 12 (FIG. 5), and a quarter inner panel assembly 9 (FIG. 6).

The side outer reinforcement assembly 12 is connected with the inside of the side outer panel assembly 8 at a position forward of the center pillar 3. The quarter inner panel assembly 9 is connected with the inside of the above-mentioned side outer panel assembly 8, extending from the rear wheel house 4 to the vicinity of the center pillar 3.

Figure 7:
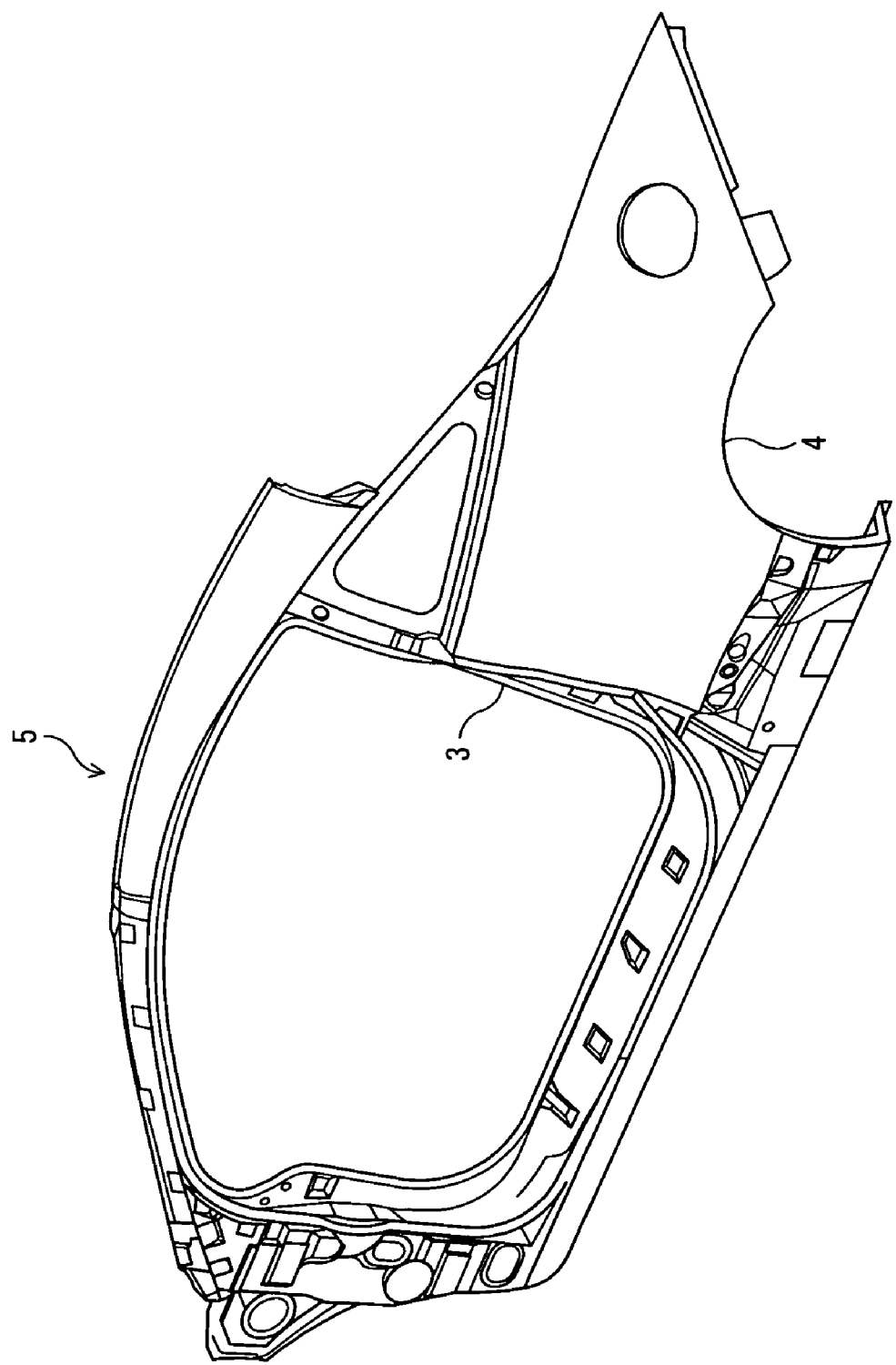
FIG. 7 is a schematic perspective view showing a side outer panel which is applied to the vehicle body structure of the present embodiment.
Figure 9:
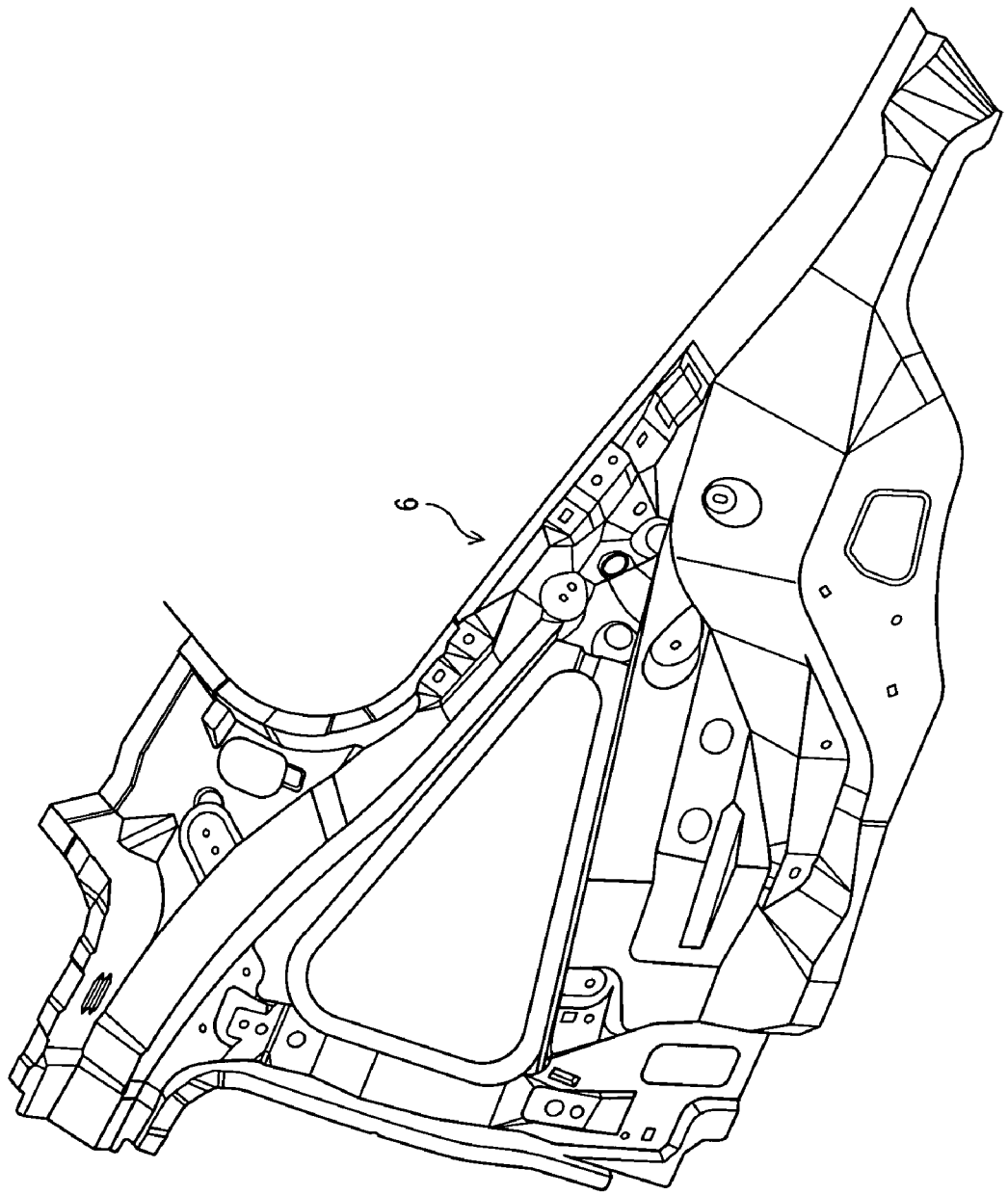
FIG. 9 is a schematic perspective view showing a quarter inner panel upper which is applied to the vehicle body structure of the present embodiment.
Figure 10:
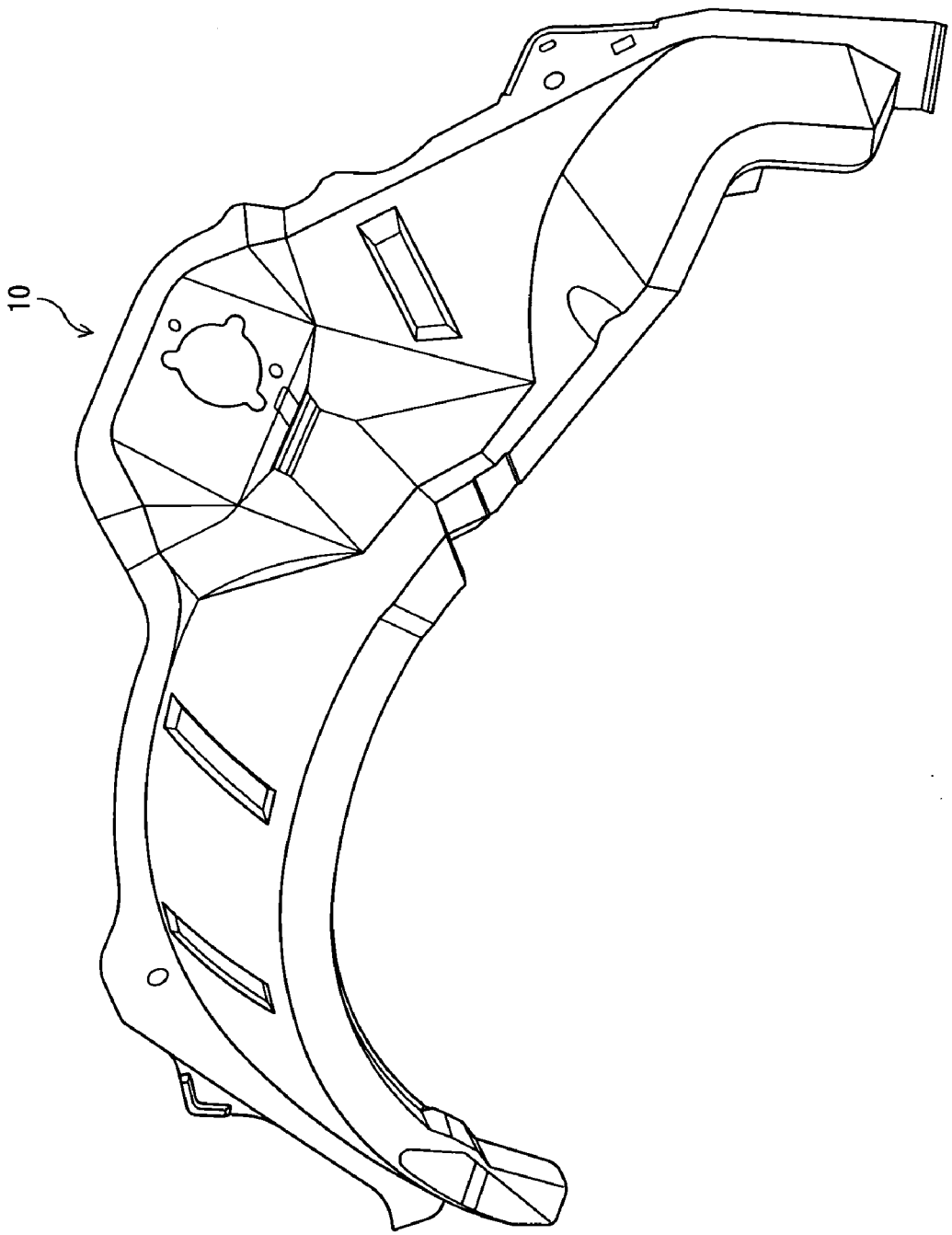
FIG. 10 is a schematic perspective view showing a quarter inner panel lower which is applied to the vehicle body structure of the present embodiment.
Figure 11:
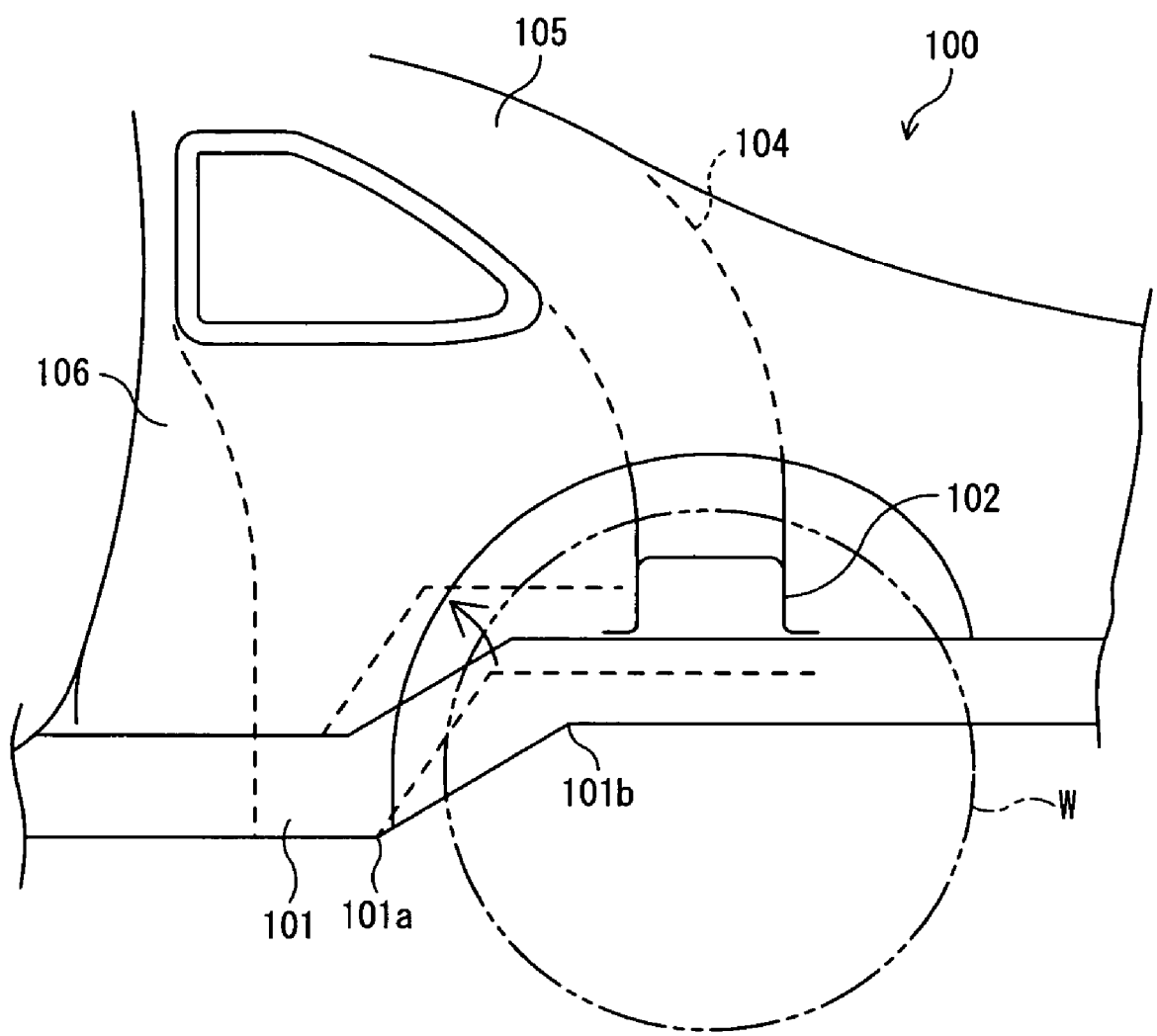
FIG. 11 is a diagram for describing an example of a prior art.

Here, the side outer panel assembly 8 includes: a side outer panel 5, which is shown in FIG. 7; the foregoing belt line reinforcement 2. Further, the quarter inner panel assembly 9 includes: a quarter inner panel upper 6, which is shown in FIG. 9; a quarter inner panel lower 10, which is shown in FIG. 10; and a rear wheel house inner panel 11 (see FIG. 6).

Figure 2:
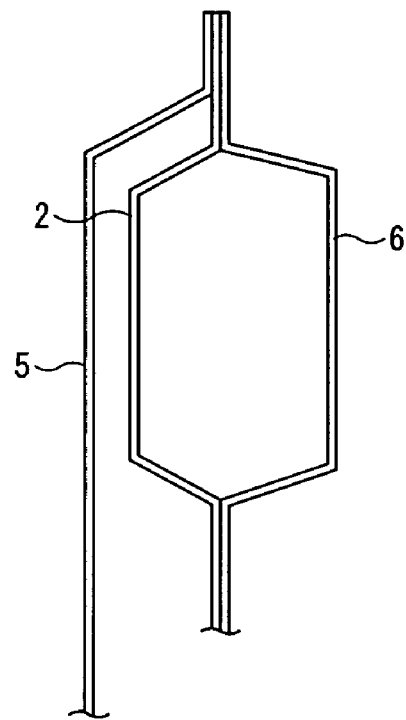
FIG. 2 is a diagram showing a construction of the vehicle body structure of the present embodiment, and is a cross section along the line A-A of FIG. 1.

As shown in FIG. 2, the belt line reinforcement 2 is connected with the quarter inner panel upper 6 at the inside of the side outer panel 5, thereby forming a closed cross section, and this will realize improved strength.

Figure 3:
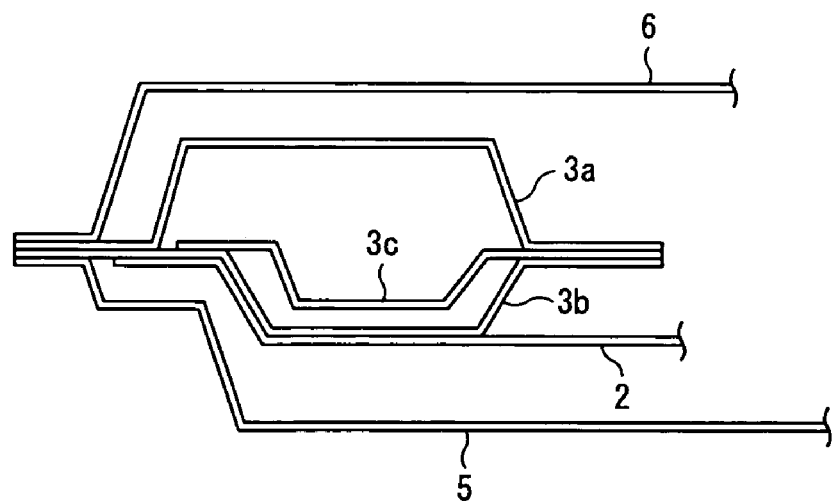
FIG. 3 is a diagram showing a construction of the vehicle body structure of the present embodiment, and is a cross section along the line B-B of FIG. 1.

Further, as shown in FIG. 3, the center pillar 3 includes: a center pillar inner 3a; a center pillar outer 3b; and a center pillar reinforcement 3c interposed therebetween. The belt line reinforcement 2 is connected with the above center pillar outer 3b. The side outer panel 5 is disposed outside the belt line reinforcement 2, and the quarter inner panel upper 6 is disposed inside the center pillar 3.

The flanges, i.e., the center pillar inner 3a, the center pillar outer 3b, the side outer panel 5, and the quarter inner panel upper 6 are welded by spot welding or the like.

The belt line reinforcement 2 is welded approximately around its periphery to the quarter inner panel upper 6, except for a connection part with the center pillar 3. This arrangement provides two closed section structure members extending in the longitudinal direction of the vehicle body at different heights. More specifically, at a lower part of the vehicle body, a side member 1 forms a first closed section structure member extending in the longitudinal direction of the vehicle body; at an upper part of the vehicle body, a combination of the belt line reinforcement 2 and the quarter inner panel upper 6 forms a second closed section structure member extending in the longitudinal direction of the vehicle body. This arrangement enables suppressing deformation of the vehicle body as much as possible at the time of a collision from the front or from behind, and the arrangement also makes it possible to improve the strength against a lateral collision.

Since the vehicle body structure of the present embodiment has the above-described construction, if collision energy is input from behind the vehicle body at the time of a collision from behind, this energy is efficiently dispersed to the center pillar 3 and the rear pillar 7 via the belt line reinforcement 2, so that deformation of the vehicle body is considerably suppressed.

More specifically, partly since the load input from behind to the rear wheel house 4 is input to the rear pillar 7 via the vicinity of the first side 2a of the belt line reinforcement 2 of FIG. 1, and partly since the load is also input to the center pillar 3 via the second side 2b of the belt line reinforcement 2, it is possible to disperse the load input to the rear wheel house 4 to the two pillars 3 and 7, so that deformation of the rear wheel house 4 is suppressed as much as possible. Accordingly, an unillustrated fuel tank's relative displacement is successfully suppressed, whereby damages to the fuel tank are prevented.

In addition, at the time of a collision from behind, the load is dispersedly input to a side member 1 (first closed section member) and to a closed section member (second closed section member) formed by the belt line reinforcement 2 and the quarter inner panel upper 6, so that the energy is efficiently dispersed, resulting in reduction of the load input to the side member 1. This makes it possible to suppress deformation of the side member 1 with the bend portions 1a and 1b of the side member 1 as base points. From this point of view, it is also possible to suppress damages to the fuel tank.

Further, differing from the prior art, in the above construction, the vehicle's body strength at the time of a collision from behind is not dependent on the positions of the cross member and the rear pillar, and this will bring about the following advantages. Freedom of design is improved; anti-collision performance is improved; the present art is applicable to a wide range of types of vehicles.

In addition, since the load input to the belt line reinforcement 2 is mainly transferred to the center pillar 3, a thinner rear pillar 7 is made available, so that a blind spot is considerably reduced, and superior design is also made available.

Further, since the belt line reinforcement 2 connects between the center pillar 3 and the rear wheel house 4, it is possible to improve the vehicle's body strength against a sideways collision.

Furthermore, the present invention should by no means be limited to the above-illustrated embodiment, but various changes or modifications may be suggested without departing from the gist of the invention. For example, although the above description is made of a two-door automobile, the present invention is also applicable to three-door automobiles and other types of automobiles.

What is claimed is:

1. A body structure for a vehicle, comprising:
    a center pillar of the vehicle;
    a rear wheel house arranged to the rear of said center pillar; and
    a belt-line reinforcement member which is arranged between the rear wheel house and the center pillar of the vehicle and is made of a single-piece panel directly connecting a front part in front of a top portion of said rear wheel house with the center pillar, said front part being inclusive of the top portion of said rear wheel house,
    wherein said belt-line reinforcement member has a front end for connecting the belt-line reinforcement member to the center pillar, and a rear end for connecting the belt-line reinforcement member to said rear wheel house, the belt-line reinforcement member being connected to the center pillar only at the front end,
    wherein the front end is located higher in position within the vehicle than the rear end, and
    wherein the rear end has a first side that extends upward substantially in a vertical direction for suppressing an upward displacement of a rear tire at a time of a collision from behind of the vehicle.

2. The body structure for a vehicle as set forth in claim 1, wherein said second end has a second side that extends in a diagonally forward direction for suppressing displacement of the rear tire in the diagonally forward direction at the time of collision from behind the vehicle.

3. The body structure for a vehicle as set forth in claim 1, further comprising:
    an outer panel; and
    an inner panel opposing the outer panel,
    wherein said belt-line reinforcement member forms a closed cross section in combination with the inner panel.

4. The body structure for a vehicle as set forth in claim 1, wherein said center pillar includes a center pillar outer and a center pillar inner that forms a closed cross section in combination with the center pillar outer, and
    wherein said belt-line reinforcement member is connected to an outer surface of the center pillar outer.

* * * * *

UNITED STATES PATENT AND TRADEMARK OFFICE
CERTIFICATE OF CORRECTION

PATENT NO. : 7,472,948 B2  
APPLICATION NO. : 11/234242  
DATED : January 6, 2009  
INVENTOR(S) : Takayuki Yatabe et al.

It is certified that error appears in the above-identified patent and that said Letters Patent is hereby corrected as shown below:

Title Page item 73 1st Assignee should read.
   \*\* Mitsubishi Jidosha Engineering Kabushiki Kaisha, Ukaza<u>ki</u>, Japan \*\*

Signed and Sealed this

Twelfth Day of May, 2009

JOHN DOLL  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,472,948 B2 | Page 1 of 1 |
| APPLICATION NO. | : 11/234242 | |
| DATED | : January 6, 2009 | |
| INVENTOR(S) | : Takayuki Yatabe et al. | |

It is certified that error appears in the above-identified patent and that said Letters Patent is hereby corrected as shown below:

Title Page, Item (73) Assignees: Delete "Ukazahi" insert -- Okazaki --.

Signed and Sealed this

Twenty-sixth Day of May, 2009

JOHN DOLL
*Acting Director of the United States Patent and Trademark Office*